INVENTOR.
Richard Leland Nash
BY
ATTORNEY.

Patented Feb. 16, 1937

2,071,083

UNITED STATES PATENT OFFICE 2,071,083

TABULATING AND COMPUTING SYSTEM

Richard Leland Nash, Wilkinsburg, Pa., assignor of one-half to Harold Fearon, Edgewood (Pittsburgh), Pa.

Application May 16, 1935, Serial No. 21,771

24 Claims. (Cl. 235—58)

This invention relates to tabulating and computing systems, and more particularly to systems of this character in which data appearing on cards or tape are automatically transferred to and reproduced in a computing machine where the desired computing operation is performed.

In modern business organizations the need for statistical and record data is well recognized. An efficient and convenient manner of assembling this data is to suitably place it on cards or tape. When this is done it is frequently necessary to take data from the cards or tape and, in order to arrive at desired results, carry out certain computations. For example, where the data are contained in a large number of cards it will be necessary to take parts from each card, record all the parts in a convenient manner and then totalize the parts to determine the aggregate.

If in carrying out the process described in the foregoing example an operator is required to handle individually each card, then the process becomes rather laborious and subject to human error. To avoid this it has been heretofore proposed to perforate each card in a manner such that the positions of the perforations represent numerically the data on each card. Mechanism has then been provided to transfer the data represented by the perforations to a computing machine, as for example an adding machine, where the computing operation is performed at the desired time.

A principal object of the present invention is to provide an improved form of mechanism for tabulating and computing data from cards or tape represented by perforations, slits or notches in the cards or tape.

A further object of the invention is to provide a mechanism of the character above referred to which is purely mechanical in character and free of the difficulties experienced with heretofore proposed mechanisms employing either electrical or pneumatic elements for performing the essential operations.

A more specific object of the invention is to provide a mechanism which is controlled by notches or slits in the edge of a card.

A yet further object of the invention is to provide a mechanism responsive to notches in the edge of a card, and which will function to operate a key, or similar element, on a computing machine corresponding to a sum of the numbers represented by a plurality of such notches.

A yet more specific object of the invention is to provide a plurality of selective, number-representing elements or fingers, each of which is adapted to have a plurality of positions, and means for depressing a single key on a standard adding machine in response to movement of one or a plurality of said fingers or elements to a certain effective position, the key thus depressed representing the sum of the numbers corresponding to the moved fingers.

A still further object is to provide a mechanism in which suitably notched or perforated cards are continuously fed one by one to a work station, where a transfer mechanism transfers the desired data thereon to a computing machine, as an adding machine, the feeding means, transfer mechanism and computing machine being so controlled in a time sequence that the process continues automatically until the last card passes through the mechanism, with desired computing operations being performed by the computing machine at predetermined times.

Still further and more specific objects relating to novel arrangements of parts, and specific constructions, will be more apparent from the following description, which has been illustrated in the attached drawings, wherein.

The embodiment of the invention above referred to has been illustrated and will be described with particular reference to an adding machine, but as the description proceeds it will be apparent that the invention is adaptable to a number of kinds of computing and tabulating machines.

In addition, the embodiment illustrated is intended to operate specifically in connection with cards of the general type described in Letters Patent 1,739,087, granted to Alfred Perkins December 10, 1929. In this type of card the numerical data are arranged along the edges of the card in groups, each group comprising certain fundamental numbers which are selected singly or in combination to form a digit of a composite number. For example, referring to Fig. 3 of the drawings herein, there is shown such a card C having a group of numbers 1, 2, 4, and 7 arranged along one edge thereof. Only one group of such numbers has been shown so as to simplify the following description. In practice, however, there will be several or a number of such groups suitably disposed or arranged along the edge or edges of the card.

Each group of the numbers 1, 2, 4, and 7 represents a basis for one digit of a composite number. Thus there must be four such groups to form a basis for a composite number having four digits, as the number 9999. While each group of numbers contains only the four fundamental numbers 1, 2, 4, and 7, the other numbers required to form a digit, that is, the numbers 3, 5, 6, 8, and 9, are formed from combinations of the four fundamental numbers, as will be evident.

When it is desired to represent numerical data with such a group system of numbers, notches are cut in the card edge adjacent the desired number or combination of numbers in each group. Thus in the single group shown on card C in Fig. 3 a notch has been cut adjacent the number 1, indicating that the numerical value of the data on the card is one unit. If the value had been three units, notches would have been cut adjacent both the numbers 1 and 2; and if five units, then adjacent both the numbers 1 and 4, and so on as will be obvious. The purpose and advantage of this system in connection with the present invention will be more fully understood later.

Considering now briefly at first the embodiment of the invention herein illustrated, the arrangement of the parts is classifiable into three general divisions. The first division comprises the card retaining and feeding mechanism designated generally at F (see Fig. 1); the second division comprises the transfer mechanism designated generally at T; and the third division comprises the adding machine designated generally at M.

*Adding machine*

Considering now these divisions of parts more in detail, the adding machine M is preferably one of the standard types commonly in use and embodied in a casing 20 having a base flange 21 resting upon a supporting frame or stand 22. The machine is provided with the usual depressible numerical keys 23, which when depressed serve to register and effect a recording on a paper roll upon operation of an operating or motor bar 24. A motor 25 is provided to operate the machine when the motor bar 24 is depressed. In the type illustrated, when a total, sub-total, or other total operation is desired the motor bar 24 is first depressed, then a "total" key 26 (see Fig. 11), and then the motor bar 24 again.

Standard adding machines usually have keyboards with sufficient columns of numbers to represent digits of units, tens, hundreds, thousands, et cetera value. For the sake of brevity and clarity the present invention has been illustrated and will be described only with reference to digits of unit value.

In the type of adding machine illustrated, only one total key 26 has been illustrated, but as the description proceeds it will be understood that the invention may be adapted for use with other types of adding machines having sub-total, grand-total and other like keys for performing other totaling operations.

*Transfer mechanism*

Figure 3:
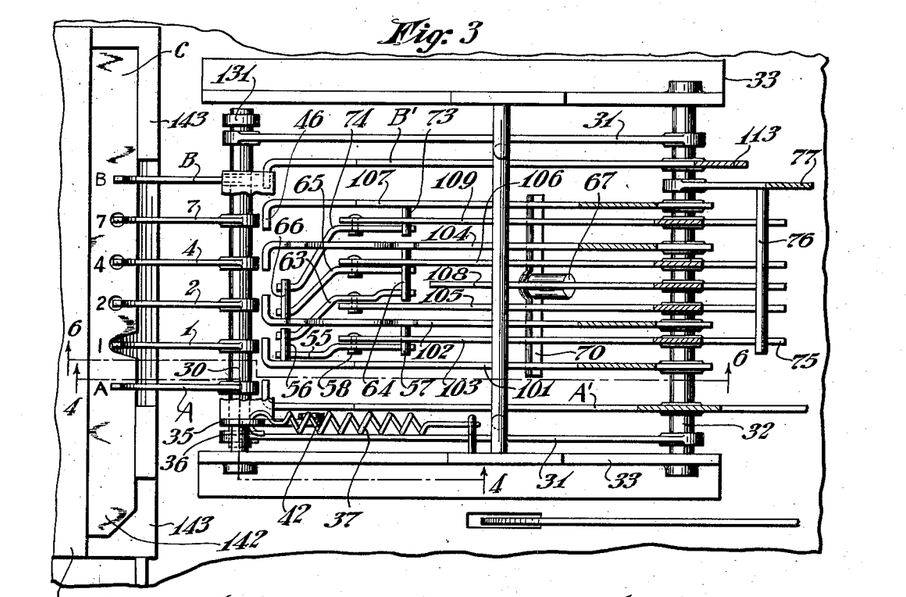
Fig. 3 is a partial top plan view of the embodiment shown in Fig. 1, showing principally the main elements of the transfer mechanism.
Figures 4, 5:
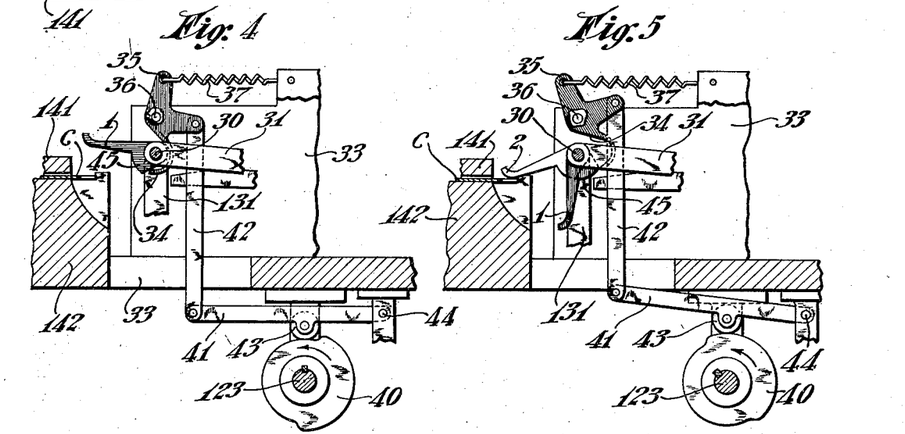
Fig. 4 is a partial view in elevation along the line 4—4 of Fig. 3, showing all the selective fingers in their biased or raised position.
Fig. 5 is a view similar to that of Fig. 4, showing one selective finger in its lowermost or operative position, and the remaining fingers in an intermediate position.

Considering now the transfer mechanism T, and referring particularly to Figs. 3, 4, and 5, there are provided a plurality of fingers or response elements 1, 2, 4, 7, A and B, which are pivotally disposed in spaced relation on a shaft or pivot forming member 30. The shaft 30 is carried at either end by two guiding levers 31, which are pivotally mounted and free to oscillate about a carrier shaft 32, supported in the frame 33 of the transfer mechanism. The guiding levers 31 serve to guide the finger carrying shaft 30 in moving from the upper position shown in Figs. 4 and 5 to the lower position shown in Figs. 7 and 8, in a manner and for a purpose to be more fully described hereinafter.

When the shaft 30 is in the upper position, the fingers are held in a raised or biased position by a retaining element 34, secured to or integral with a bell crank lever 35. The bell crank lever is pivotally supported in the frame 33 at 36 and is urged by a spring 37 in a clockwise direction to normally maintain the fingers 1, 2, 4, 7, A and B raised.

For releasing the fingers to permit them to rotatively drop to a lower position, there is provided a mechanism including a cam 40 adapted to actuate upwardly a lever 41 and link 42, through the medium of a roller 43 carried by the lever 41, which is pivotally mounted at one end to the framework at 44. Link 42 is pivotally connected to the bell crank lever 35 and to the lever 41 in a manner such that when the high part of cam 40 engages the roller 43, the bell crank lever 35 is rocked in a counter-clockwise direction far enough for the retaining element 34 to move to the right (see Fig. 5) a sufficient distance to permit the fingers to drop.

If, as shown in Fig. 3, a card C is fed to a work station under the fingers, then when the fingers are dropped to the edge of the card one or more fingers will pass through the adjacent notches in the card while the other fingers are arrested by the card. It is to be here understood that as illustrated the fingers drop solely due to gravity effect and are light enough to be easily arrested by the card where notches are absent, but mechanical means, such as springs, may be employed to move the fingers.

When the fingers are arrested by the card they are in an intermediate or inoperative position, and when they pass through the notches in the card to a lower position below the card they are in an operative position. By spacing the fingers on the shaft 30 to correspond to the numbers on the card C, it will thus be apparent that any one or combination of fingers may be selected for movement to the lower or operative position by suitably notching the card.

Associated with the fingers 1, 2, 4, 7, A and B are, respectively, fundamental or permutation levers 101, 102, 104, 107, $A^1$ and $B^1$. Each of these fundamental levers is pivotally mounted on the carrier shaft 32, as will be observed from Fig. 3, and held in a raised position against stops 38 by springs 39. Now when any one of the fingers 1, 2, 4, 7, A and B is in its lowermost or operative position, and the finger carrying shaft 30 is moved downwardly, a cam or projection 45 on the finger is in a position to engage an inwardly turned end 46 of the associated fundamental lever. For example, if finger 1 is in its operative position during this movement of shaft 30, then fundamental lever 101 will be rocked downwardly about carrier shaft 32 upon the downward movement of shaft 30.

Figure 6:
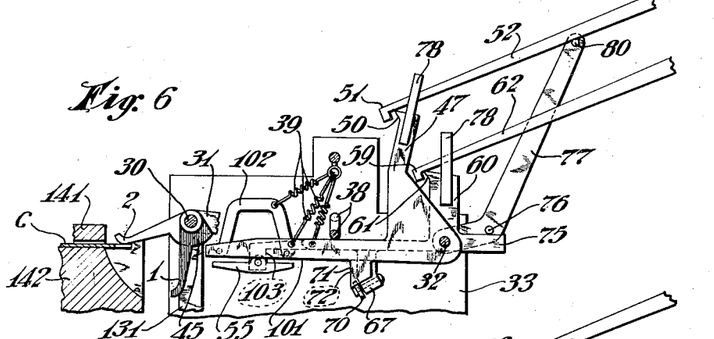
Fig. 6 is a view along line 6—6 of Fig. 3, showing the lever mechanisms controlled by the selective fingers.
Figure 7:
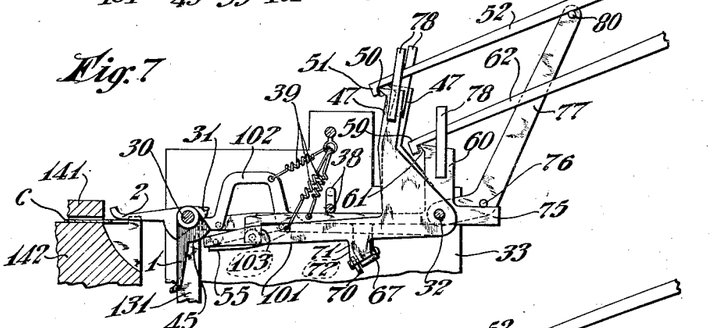
Fig. 7 is a view similar to that of Fig. 6, showing a fundamental or permutation lever in operative position.
Figure 8:
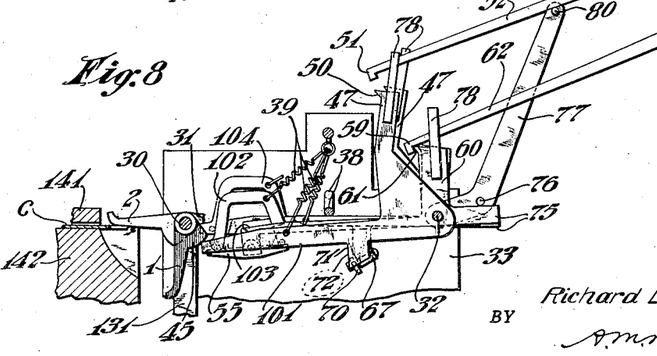
Fig. 8 is a view similar to that of Fig. 6, showing a combinational lever in operative position.
Figure 9:
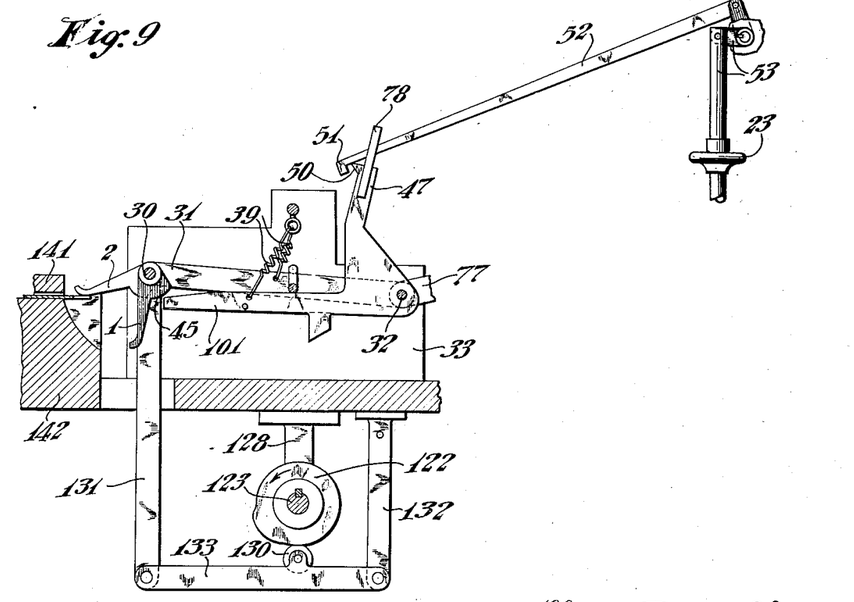
Fig. 9 is a view similar to Figs. 6, 7, and 8, showing in addition means for actuating the keys of a computing machine and timing means for controlling operation of the fingers.

As may be seen from Figs. 6, 7, and 8, each of the fundamental levers 101, 102, 104 and 107 (but not $A^1$ and $B^1$) is provided with an upwardly extending portion 47 having a toothed edge 50 adapted to engage a coacting end of a pull rod 52. That is, there is a pull rod corresponding to and actuated by each of the fundamental levers 101, 102, 104, and 107. Each of these pull rods 52 is adapted, when pulled far enough to the left, to depress a numerical key 23 on the adding machine M, through a system of levers and rods indicated at 53 in Fig. 9, which are carried by a supporting plate 54, as is more clearly shown in Fig. 1.

The purpose and functioning of the fundamental levers $A^1$ and $B^1$ will be described later.

From the foregoing description it should be evident that upon movement of any one of the fingers 1, 2, 4, and 7 to its lowermost or operative position, followed by downward movement of shaft 30, the corresponding fundamental lever and associated mechanism will function to depress an adding machine key corresponding to the number of the finger operated. The mechanism for depressing keys corresponding to the numbers 3, 5, 6, 8 and 9 will now be described.

As is more clearly shown in Fig. 3, there are interspersed with the fundamental levers 101, 102, 104 and 107, and pivotally disposed on the carrier shaft 32, a plurality of combinational levers 103, 105, 106, 108, and 109.

Carried by and pivotally secured intermediate its ends at 58 to the end of the combinational lever 103 is a bridge lever 55. This bridge lever 55 is adapted to be engaged by a projection 56 rigid with the fundamental lever 101 and another projection 57 rigid with the fundamental lever 102, when these two fundamental levers are simultaneously operated downwardly, to in turn operate the combinational lever 103 downwardly. Each of the combinational levers 103, 105, 106, 108, and 109 is provided with an upwardly extending portion 60 having a toothed edge 61 adapted to engage a coacting end 59 of a pull rod 62. Each pull rod 62, like the pull rods 52 before described, is adapted to depress a numerical key 23 corresponding to the number represented by the combinational lever, as for example, the numeral 3 in the present instance.

The other combinational levers are operated in a similar manner. The combinational lever 105 has pivotally secured to its left end a bridge lever 63, which is engaged by projection 56 on fundamental lever 101 and projection 64 on fundamental lever 104, when these two fundamental levers are simultaneously operated downwardly, the combinational lever 105 then functioning to actuate a pull rod 62 to depress, through operation of a set of levers and rods 53; the adding machine key for the numeral 5.

The combinational lever 106 has a bridge lever 65 pivotally secured to its end, which bridge lever is engaged by projection 66 on fundamental lever 102 and projection 64 on fundamental lever 104, when these two fundamental levers are simultaneously operated downwardly, to effect depressing of the adding machine key for the numeral 6, through levers and mechanism as before described.

The mechanical arrangement for operating the combinational lever 108 is slightly different from that for the other combinational levers, although the principle of operation is the same. This combinational lever is provided with a downwardly extending post 67 to which is pivotally secured a transverse bar 70. This transverse bar is adapted to be engaged by a projection 71 extending downwardly from the fundamental lever 101 and a similar projection 72 on the fundamental lever 107, when these two fundamental levers are simultaneously operated downwardly. A pull rod 62 is then operated by the combinational lever 108 to depress the adding machine key for the numeral 8.

The combinational lever 109 is operated to depress the adding machine key for the numeral 9 when the two fundamental levers 102 and 107 are simultaneously depressed, the projections 66 and 73 associated with these two levers, respectively, engaging a bridge lever 74 pivotally carried by the combinational lever.

As heretofore described, the fundamental levers operate the pull rods 52 while the combinational levers operate the pull rods 62. In order that the pull rods operated by the fundamental levers 101, 102, 104, and 107 shall be rendered ineffective to depress an adding machine key when the combinational levers are operated, each combinational lever is provided with an extension 75, which is adapted to engage a rod 76 rigid with a raising lever 77 also pivotally disposed on the carrier shaft 32. The raising lever 77 is provided with a transverse rod 80 which is adapted to engage and raise all the pull rods 52 when the raising lever is rocked in a counter-clockwise direction.

In order that the raising lever 77 shall be effective in raising the pull rods 52, before the ends 51 are engaged by the teeth 50, when two or more fundamental levers are moved downwardly, the parts are arranged as will now be described. As will be noted from Fig. 6, the bridge lever 55 is carried by the combinational lever 103 in a manner such that its ends are spaced from the engaging projections 56 and 57, on fundamental levers 101 and 102 respectively, so that these two fundamental levers must be moved together downwardly through a predetermined distance before the bridge lever 55 is simultaneously engaged by the projections 56 and 57 to operate combinational lever 103.

Now the tooth 50 on the upwardly extending portion 47 of each fundamental lever 101 and 102 is spaced from the coacting end 51 of the associated pull rods 52 a distance such that engagement between these two does not take place until after bridge lever 55 has been engaged by the projections 56 and 57 and the combinational lever moved through a short distance. This permits the raising lever 77 to be actuated far enough to raise the pull rods 52 before they are pulled. (See Fig. 8). The pull rod 62 which is operated by the combinational lever 103 is thus the only pull rod actuated, the adding machine key corresponding to the sum of the numbers of the selected fingers then being depressed as a result.

If the fundamental lever 101 only is moved downwardly, then the bridge lever 55 assumes a position as shown in Fig. 7. Engagement of projections 56 and 57 with bridge lever 55 takes place only as the fundamental lever 101 reaches the end of its downward travel. Therefore, the combinational lever 103 is not actuated and the pull rod 52 corresponding to the fundamental lever 101 is actuated. The same principle applies when fundamental lever 102 only is operated.

All of the bridge levers, and transverse bar 70, are arranged and function in the manner described for the bridge lever 55.

In order that the pull rods 52 and 62 shall be maintained in alignment with their associated fundamental and combinational levers, respectively, each of the extensions 47 and 60 is provided with a guiding element 78 suitably apertured to pass and permit all desired movements of the cooperating pull rod.

Figures 11, 12:
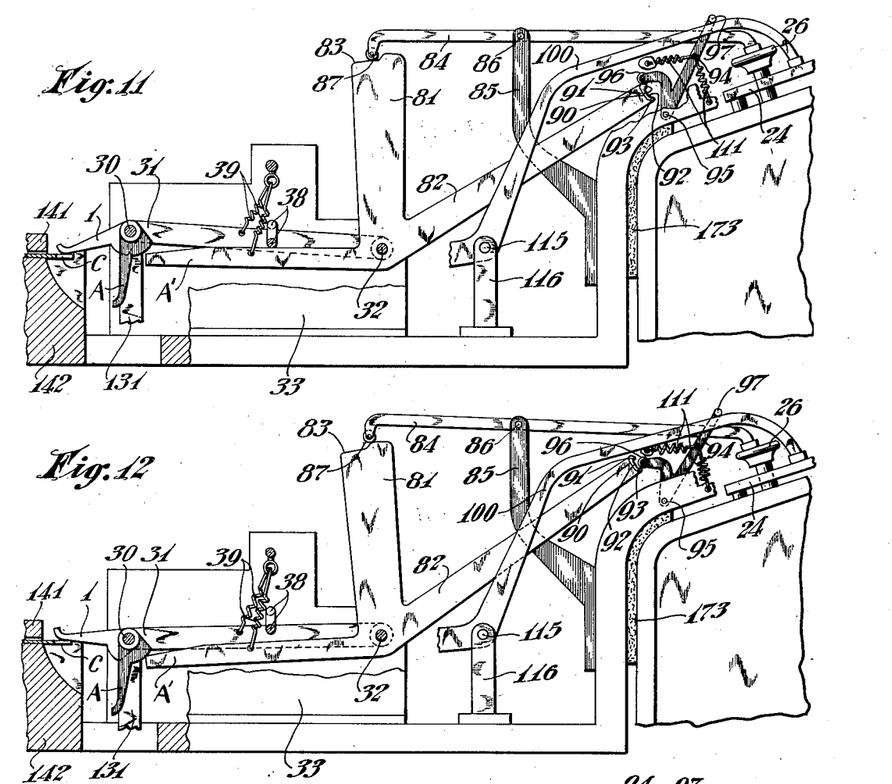
Figs. 11 to 13, inclusive, are views showing in different operative positions means for operating a key and a motor or operating bar of an adding machine to perform a sub-total, total or related operation.
Figure 13:
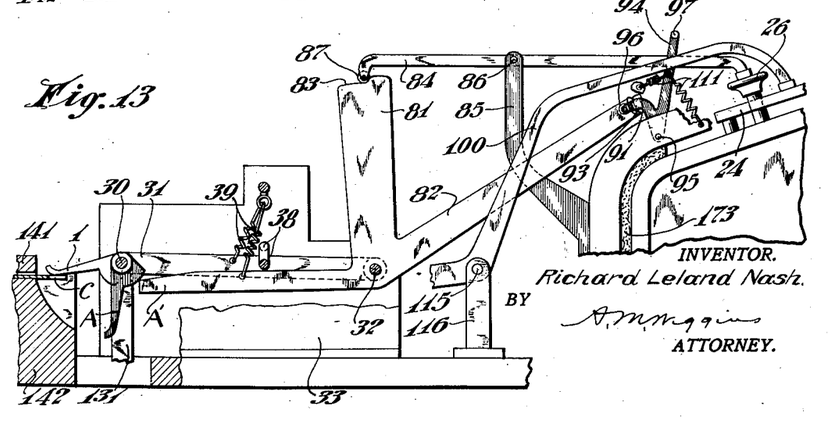

The fundamental lever A¹ is provided with two extensions 81 and 82, as is more clearly shown in Figs. 11, 12, and 13. The extension 81 is provided with a cam face 83 on its upper edge for controlling operation of a total lever 84. The total lever 84 is pivotally supported at 86 by a bracket 85 secured to the frame 33, and has secured to one end a roller 87 adapted to engage the cam face 83. When the roller 87 rolls onto the high part of the cam face 83, the total lever 84 is rocked in a clockwise direction to depress the adding machine total key 26.

The extension 82 is provided with a cam face 90 having an upper high face 91, an intermediate low face 92 and a lower high face 93. A bell crank lever 94, pivotally secured to the frame 33 at 95, has a roller 96 carried by one arm thereof for engaging the cam face 90. The other arm of the bell crank lever 94 is provided with a pin 97 for engaging and operating downwardly a motor bar lever 100, which functions to depress the motor bar 24 of the adding machine. A pair of springs 111 functions to urge the bell crank lever 94 toward a neutral or biased position.

When the fundamental lever A¹ is moved through a first portion of its downward travel, the upper cam face 91, on extension 82, engages roller 96 to rock the bell crank lever 94 in a clockwise direction. This causes the motor bar lever 100 to depress the adding machine motor bar 24. During a next portion of the fundamental lever travel the roller 96 engages the intermediate cam face 92, to release pressure on the motor bar 24, while at the same time roller 87 on the total lever 84 rolls onto the high part of cam face 83, to cause total key 26 to be depressed.

Upon movement of the fundamental lever A¹ through the last portion of its downward movement, roller 96 engages the lower cam face 93 to again cause the motor bar 24 to be depressed. As the fundamental lever returns upwardly to its normal position the roller 96 returns to its initial position (shown in Fig. 11) by passing on the back side of cam face 90. (See Fig. 13). This eliminates unnecessary operations of the adding machine. It will thus be seen that when the fundamental lever A¹ is operated the adding machine M effects a totaling of the quantities thereby previously registered as a result of operation of the fundamental and combinational levers.

For adding machines having a plurality of total functions, such as "total", "sub-total" et cetera, a plurality of parts such as A, A¹, 81, 82, 84, and 26, may be provided so that the desired total function can be selected through the use of a suitably punched card.

Figure 14:
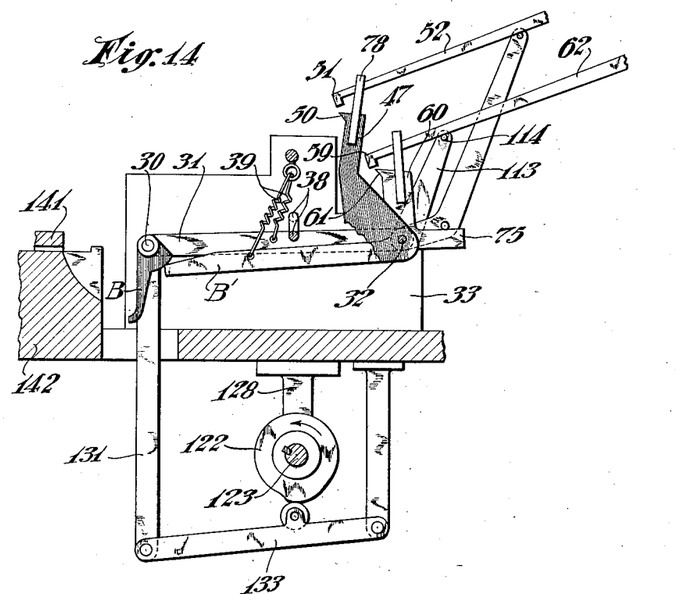
Fig. 14 is a view showing means for rendering all permutation and combinational levers ineffective when a certain control finger is in lowermost position.

Referring now to Fig. 14, the fundamental lever B¹ is provided with an extension 113 having a transverse bar 114 secured thereto, which is adapted to engage and raise all of the pull rods 62 when this fundamental lever is operated downwardly. The purpose of the fundamental lever B¹ is to prevent depressing any of the numerical adding machine keys when two or more of the fingers 1, 2, 4, and 7, plus the finger B, are moved to lower or operating position. Thus, if no card C were in position all the fingers would drop to operating position. Downward operation of all of the fundamental levers 101, 102, 104 and 107 simultaneously will render all of the pull rods 52 ineffective, while downward operation of the fundamental lever B¹ will render all of the pull rods 62 ineffective. Downward movement of the fundamental lever A¹ will, of course, effect a totalizing operation of the adding machine.

Figures 1, 2:
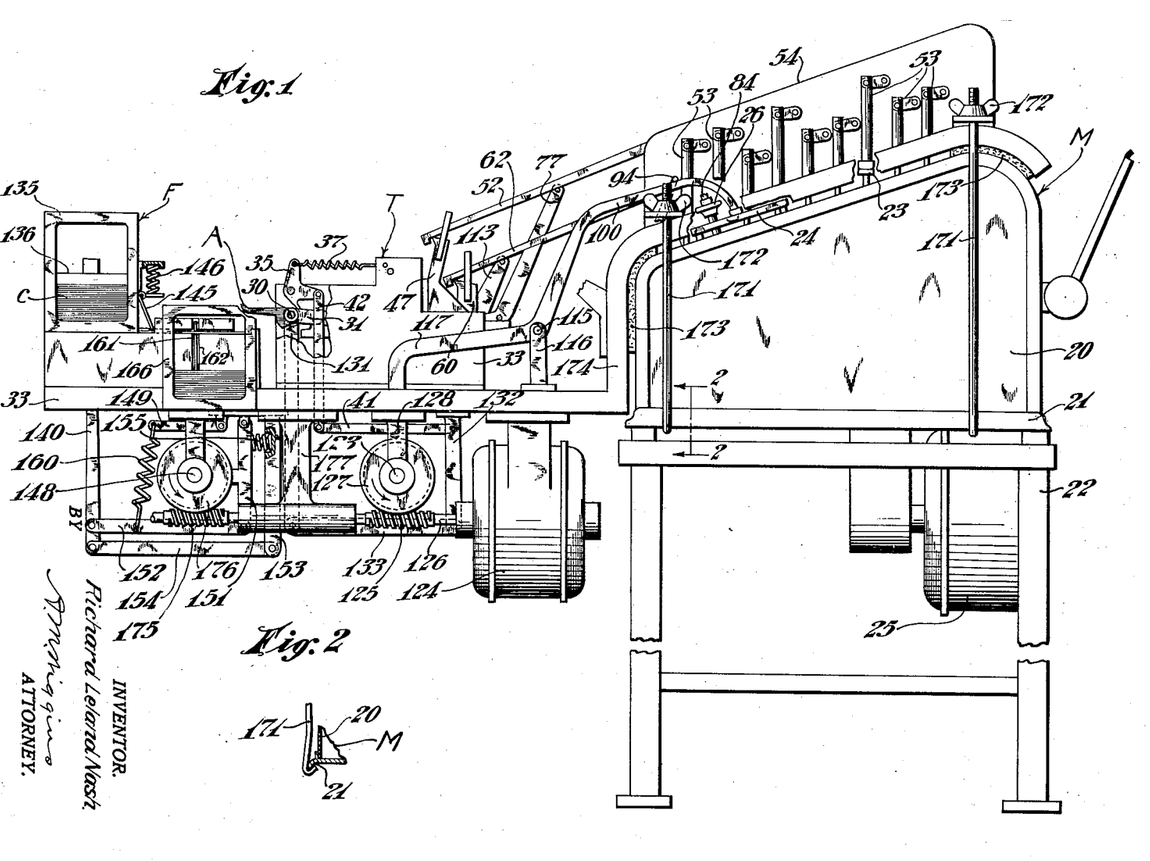
Fig. 1 is view in elevation of one embodiment of my invention, with certain parts cut away and certain other parts omitted to more clearly show the general arrangement of the mechanism employed.
Fig. 2 is a fragmentary, sectional view, along the line 2—2, showing in part how the feeding and transfer mechanism may be clamped to a standard adding machine, or other similarly constructed computing machine.
Figure 10:
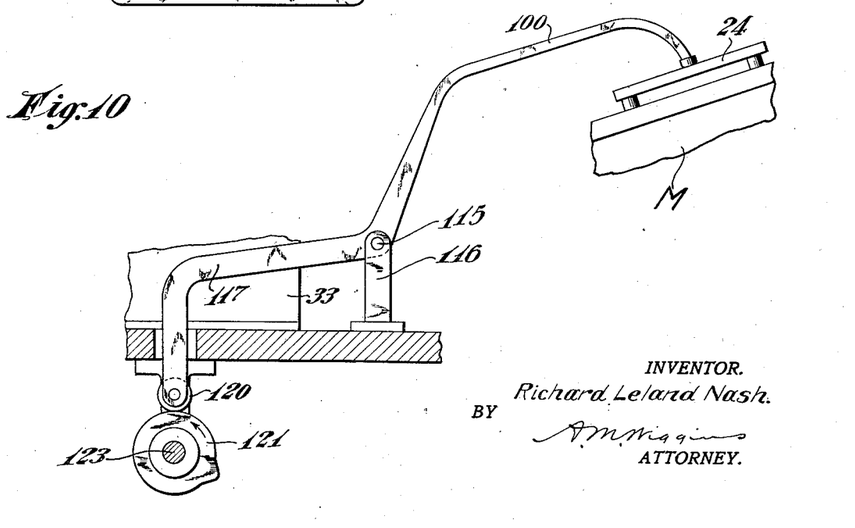
Fig. 10 is a view showing means for operating the operating or motor bar of a computing machine.

In order to provide for a continuous cyclic operation of the lever mechanisms described, the heretofore mentioned finger controlling cam 40 (Fig. 4) and two additional cams 121 and 122 (Figs. 9 and 10) are disposed on a common shaft 123. A motor 124, secured to the frame 33 as is shown in Fig. 1, drives the shaft 123 through a worm 125, on the motor shaft 126, and a worm gear 127 on the shaft 123. The shaft 123 is rotatably supported in brackets 128.

The cam 121 controls periodic operation of the motor bar operating lever 100, through a roller 120 secured to an extension 117 beyond the fulcrum 115 of the motor bar operating lever.

The cam 122 controls periodic downward operation of the finger carrying shaft 30, through a roller 130 carried by a lever 133, one end of which is pivotally connected to a bracket 132 and the other end of which is pivotally secured to a link 131 connecting with shaft 30. The sequence in which the cams 40, 121 and 122 control their associated mechanism will be described later.

*Feeding mechanism*

Considering now the feeding mechanism F, as specifically shown in Figs. 15 to 19, this mechanism comprises a hopper 135 for retaining a plurality of cards C to be fed to a work or operating station under the fingers of the transfer mechanism. A weight 136 may be employed to add a desired pressure to the stack of cards.

The floor of the card hopper 135 is provided with a transverse slot 137 in which a shoe 138 loosely attached to a feeding arm 140 may operate to feed cards one by one to the work station defined between a cover plate 141 and a table 142. The space between the cover plate and table is slightly greater than the thickness of the card, and the table is provided with a flange 143 bounding three edges of the table for a sufficient distance to serve as a guide for positioning the card in operating position. The table is cut away at 144 to permit the transfer fingers to pass downwardly to their operating position.

The shoe 138 is preferably of a resilient material, as soft rubber, so that it affords a good frictional contact with the card engaged thereby and will be effective in moving a card on the bottom of the stack of maximum height. A door 145, urged downwardly by a spring 146, is provided to prevent more than one card being moved by the shoe 138 when the feeding arm 140 is operated.

For operating the feeding arm 140 transversely, there is provided a mechanism including a cam 147 secured to a shaft 148 and being adapted to actuate the arm 140 through a roller 150, a lever 151 carrying the roller 150, and link 152. The link 152 is pivotally connected to the feeding arm 140 intermediate its ends, while the lower end of the feeding arm is loosely connected to a bracket 153 through a link 154. A spring 155 functions to urge roller 150 into contact with cam 147.

For operating the feeding arm 140 vertically, there is provided a second cam 156 also secured to the shaft 148 and operating a roller 157 carried by a lever 149 having a fixed pivoted end at 158 and having its other end connected to the aforementioned link 152 by a spring 160.

For ejecting a card from the operating or work station between the cover plate 141 and table 142, there is provided a mechanism having an ejecting arm 161 operating in a slot 162, in the cover plate and table, from a cam 163 also secured to the shaft 148. As is more clearly shown in Figs. 18 and 19, the arm 161 is pivotally mounted at 164 and is urged in a clockwise direction by a spring 165 to eject the card from the work station. The card thus ejected may fall into a receiving compartment or tray 166.

Figure 18:
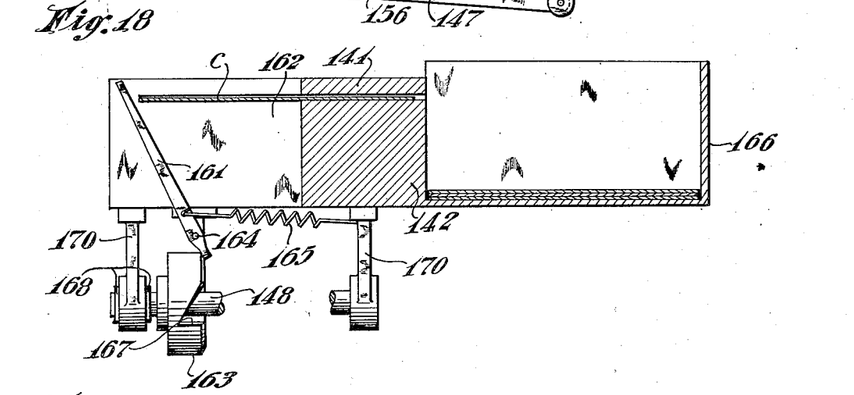
Figs. 18 and 19 are views, in section, showing in different operating positions the ejector elements of the feeding mechanism.
Figure 19:
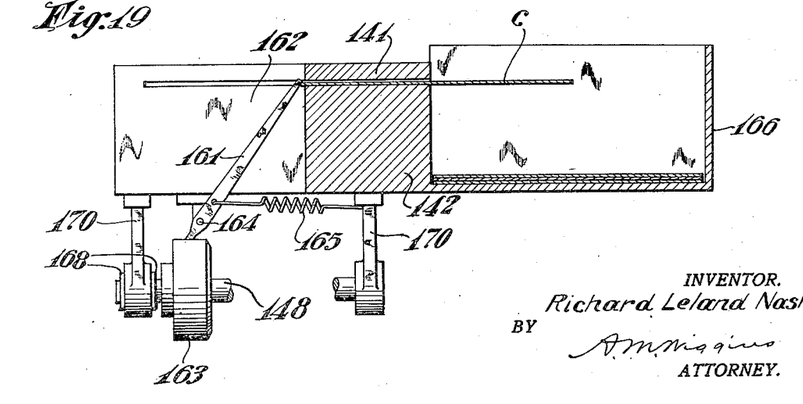

The cam 163 maintains the ejecting arm 161 to the left, as shown in Fig. 18, until a sharp descent 167 comes adjacent the inwardly turned lower end of the arm, when the spring 165 swings the arm sharply to the right. (See Fig. 19). Thrust collars 168 are secured to the shaft 148 on either side of one of the supporting brackets 170 so as to prevent end movement of the shaft.

The shaft 148 is driven from an extension of the motor shaft 126 through a worm 175 and worm gear 176. A bearing pedestal 177 supports the motor shaft extension. Both shafts 148 and 123 are rotated in the same direction. It is to be noted, however, that the direction of rotation is immaterial so long as the operation of the parts is properly synchronized.

The frame 33 is preferably designed to support the feeding mechanism and the transfer mechanism as an assembled unit, which may be clamped to a standard adding machine M by bolts 171 and wing nuts 172. The lower ends of the bolts 171 are hook shaped, so as to securely clamp under the edge of the adding machine flange 21, as shown in Fig. 2. Felt or other soft pads 173 may be interposed between the extensions 174 of the frame 33 and the adding machine, so as to prevent marring of the surface of the adding machine casing. The building of the feeding and transfer mechanisms as a unit attachable to and detachable from a standard adding machine is an important feature of the invention.

*Operation*

Figure 15:
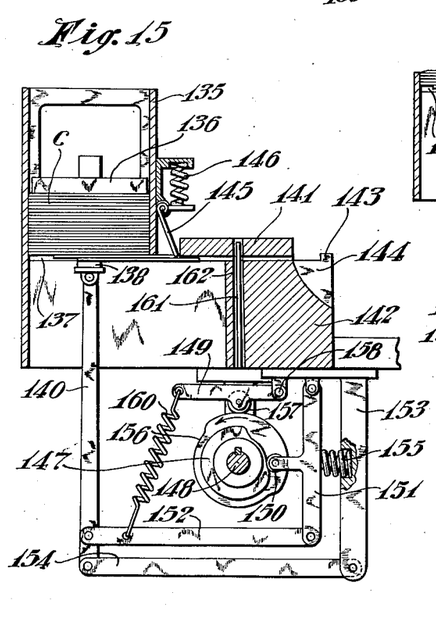
Figs. 15 to 17, inclusive, are views, in section, showing in different operating positions the feeding elements of the feeding mechanism.

The operation of this embodiment of my invention will now be described:

A stack of cards each of which has an edge notched according to numerical values represented by the card is placed in the card hopper 135, with the notched edges to the right as viewed in Fig. 15. The electric motors 25 and 124 are connected to a suitable source of current supply, so that they run continuously so long as the mechanism is operable to transfer data from the cards to the adding machine. Assuming now that at the instant the two motors start running the feeding arm 140 (Fig. 15) is in its extreme left hand position, a cycle of operation of the entire mechanism is as follows.

Figure 16:
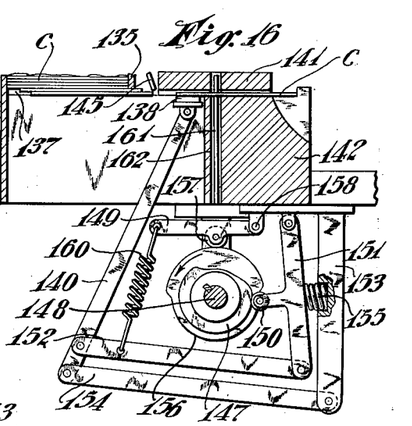
Figure 17:
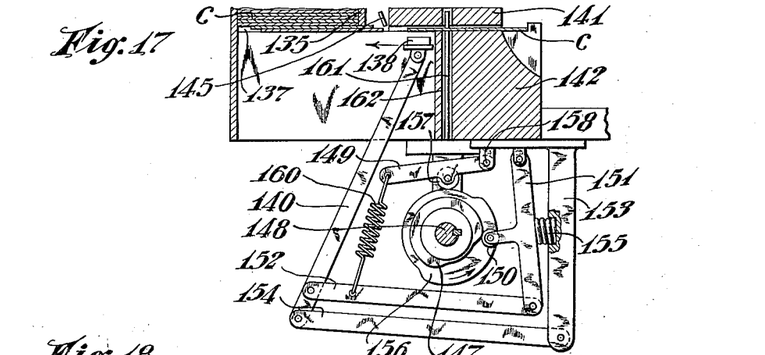

Roller 157 is now on the high part of cam 156, so that spring 160 is stretched to urge shoe 138 upwardly against the bottom card. The shaft 148 rotates in a counter-clockwise direction, so that roller 150 next rolls onto the raised portion of cam 147, as shown in Fig. 16, to cause feeding arm 140 to swing to the right and carry a card C to the operating station on table 142.

Shortly after the time the card C arrives at the operating station, cam 40 on shaft 123 will have rotated to the position where its high portion will operate lever 41 and link 42 upwardly. Bell crank lever 35 is thus rocked to permit fingers 1, 2, 4, 7, A and B to drop. Assuming that the card C at the operating station is notched as shown in Fig. 3, finger 1 only drops to its lowermost or operating position, while all other fingers are arrested by the card C in their intermediate or inoperative position. (See Figs. 5 and 6).

Shortly after the fingers have dropped, cam 122 on shaft 123 will have rotated in a counter-clockwise direction to the position where its high portion engages roller 130 to actuate the finger carrying shaft 30 downwardly. The cam or tooth 45 on finger 1 then engages the end 46 of fundamental lever 101, thus operating this lever downwardly also. (See Fig. 7). The projection 56 on fundamental lever 101 engages the bridge lever 55, but the bridge lever merely idles about its pivot and performs no useful function at this time.

As the fundamental lever 101 moves downwardly, its upwardly projecting portion 47 engages the coacting pull rod 52 to effect through the rods and levers 53 depressing of the adding machine key 23 corresponding to the numeral 1. The roller 130 then rolls off the high portion of cam 122, and shaft 30 and fundamental lever 101 return to their respective upper positions, against stop 38, by action of a spring 39.

Shortly after this takes place, cam 121 has rotated to the position where its high portion engages roller 120 to operate the motor bar operating lever 100, to in turn depress the adding machine motor bar 24. This causes the adding machine to register and record the numeral 1. The high portion on the cam 121 is of short duration so that the motor bar is immediately released to return to normal position.

Shortly after the motor bar has been released, the cam 40 on shaft 123 has rotated to the position where roller 43 rolls off the high part of the cam, and the bell crank lever 35 is rocked in a clockwise direction so that the retaining element 34 raises all of the fingers to their upper position. (Fig. 4).

At or about the time this last operation takes place, roller 157 of the feeding mechanism rolls off the high part of cam 156 (see Fig. 17), so that shoe 138 is moved away from the card C at the work station. Roller 150 then rolls off the high part of cam 147, to position the feeding arm 140 again in its extreme left hand position.

While the feeding arm 140 is moving to its initial position, cam 163 on shaft 148 rotates to the position where the lower end of ejecting arm 161 comes adjacent the sharp descent 167, and spring 165 swings the ejecting arm sharply to the right (see Fig. 19), thus ejecting the card from the operating station into the receiving tray or compartment 166.

The parts are now ready to feed another card to the operating station to have data thereon transferred in a similar manner to the adding machine.

If the card fed to the operating station has two notches in its edge, it will be apparent from the preceding detailed description of the parts that the combinational lever corresponding to the combination of the two fingers selected will function to depress the proper adding machine key. In other respects the cycle will be substantially as just described.

If it is desired to total the data thus registered and recorded by the adding machine, the last card run through may be notched to select the finger A only, or all the fingers may be permitted to drop to the lower or operating position, in either case of which the totalizing operation of the adding machine will be effected, as previously described.

If it is desired to total the data after any one particular card has been fed to the operation station, then a card having its edge notched only adjacent the character A, so as to select the finger A, is placed next in the stack. The totalizing operation of the adding machine may thus be caused to take place any number of times during the "working" of a stack of cards.

It will be observed that the mechanism employed in practicing the invention is of a purely mechanical nature, and so arranged that it is positive in action and substantially as free of probable operating errors as occur in commonly used adding and other computing machines. I therefore consider the mechanical arrangements of parts to be an important feature of the invention.

Recognizing that a number of modifications may obviously be made in the embodiment of the invention illustrated, it is not my intention to be limited to the particular details there shown, nor otherwise than according to the spirit and scope of the appended claims.

Having described my invention, what I claim and desire to secure as Letters Patents is as follows:

1. In a computing mechanism, in combination, a pivot forming member, a plurality of fingers pivotally mounted on said member and adapted to rotate about said member, means for normally retaining said fingers in a biased position from which they rotatively drop by gravity upon release to an operative position unless arrested at will in an intermediate position, means for actuating said pivot forming member in an operative direction, a plurality of lever mechanisms each of which is adapted to be actuated by a different one of said fingers when in operative position and upon movement of said pivot forming member, and a computing machine adapted to be operated by said lever mechanisms.

2. In a computing mechanism, in combination, an adding machine having depressible keys corresponding to numerals, a plurality of number representing fingers, each of said fingers being rotatable to an intermediate or an extreme position, common pivotal means for said fingers, means for moving said common pivotal means, and a plurality of independent lever mechanisms each of which is operated by one of said fingers when in said extreme position upon movement of said pivotal means for depressing one of said keys.

3. In combination, an adding machine having depressible keys corresponding to numerals and also having an operating bar, a plurality of key operating lever mechanisms for operating said keys, a bar operating lever mechanism for operating said operating bar, a movable carrier element, a plurality of card sensing fingers pivotally carried by said carrier element, each of said fingers corresponding to one of said key operating lever mechanisms and being adapted to actuate the associated lever mechanism when said carrier element is actuated through a predetermined distance, a plurality of continuously rotatable cams, and means operated by said cams for first actuating said carrier element and then actuating said bar operating lever mechanism.

4. In combination, an adding machine having keys corresponding to numerals, two fingers each of which corresponds to a numeral and is selectively actuable from a biased position to an operating position, a first lever mechanism for operating a key on said adding machine corresponding to the numeral represented by one of said fingers, a second lever mechanism for operating another key on said adding machine corresponding to the numeral represented by the other of said fingers, a third lever mechanism for operating still another key on said adding machine corresponding to the sum of the numerals represented by said two fingers, and means associated with said fingers for effecting operation of said lever mechanisms according as said fingers are actuated to said operating position.

5. In combination, an adding machine having at least a first key, a second key and a third key; a first lever mechanism for operating said first key; a second lever mechanism for operating said second key; a third lever mechanism for operating said third key; two fingers each of which is selectively actuable; means associated with said two fingers for effecting operating of said first and second lever mechanisms; and means operated in response to simultaneous operation of said first and second lever mechanisms for operating said third lever mechanism.

6. In combination, an adding machine having at least a first key, a second key and a third key; a first lever mechanism for operating said first key; a second lever mechanism for operating said second key; a third lever mechanism for operating said third key; two fingers each of which is selectively actuable; means associated with said two fingers for effecting operating of said first and second lever mechanisms; and means operated in response to simultaneous operation of said first and second lever mechanisms for operating said third lever mechanism; and means operable upon operation of said third lever mechanism for preventing operation of said first and second keys by said first and second lever mechanisms.

7. In combination, an adding machine having at least a first key, a second key and a third key; a first mechanism for actuating said first key; a second mechanism for actuating said second key; a third mechanism for actuating said third key; means for actuating said third mechanism to actuate said third key upon simultaneous operation of said first and second mechanisms; means for preventing operation of said first and second keys upon operation of said third mechanism; a reciprocating member; two fingers pivotally carried by said member; means for operating said reciprocating member; and means controlled by said fingers for actuating said first and second mechanisms.

8. In combination, an adding machine having at least three keys and an operating element operable to effect adding of numbers corresponding to said keys, one of said keys corresponding to the sum of the numbers represented by the two other of said keys, a first lever mechanism for operating said sum key, two other lever mechanisms for operating selectively said two other keys, two selectively operated control elements, means operative in response to selective operation of one only of said two control elements for effecting actuation of one of said two other lever mechanisms to operate one of said keys associated therewith, means operative in response to simultaneous operation of said two control elements for effecting operation of said first lever mechanism only to operate said sum key only, and means for operating said operating element on said adding machine in timed relation with operation of either of said lever mechanisms.

9. In combination, an adding machine having at least three keys and an operating element operable to effect adding of numbers corresponding to said keys, one of said keys corresponding to the sum of the numbers represented by the two other of said keys, a first lever mechanism for operating said sum key, two other lever mechanisms for operating selectively said two other keys, three selectively operated fingers, a carrier member pivotally supporting said fingers, means for supporting said fingers in an inoperative position and operative to permit said fingers to move to either an intermediate position or an operative position, means for moving said carrier member when said fingers have moved to one or the other of said last two mentioned positions, means operative when one finger only has moved to said operating position for actuating one of said two other lever mechanisms, to operate one of said two other keys, means operative when two predetermined fingers only have simultaneously moved to said operating position for actuating said first lever mechanism to operate said sum key, and means operative when all three fingers have simultaneously moved to said operative position to prevent either of said lever mechanisms from operating any one of said keys.

10. In combination, a first lever corresponding to a first number, a second lever corresponding to a second number, a third lever corresponding to a third number, a computing machine, means operative in response to movement of any one of said levers for operating said computing machine to register the number corresponding to that lever, and means operative in response to simultaneous movement of said first and second levers for actuating said third lever to set said computing machine to make it ready to register the number corresponding to said third lever.

11. In combination, an adding machine, a key operating lever mechanism for operating a key of said adding machine, a first lever adapted when operated to render said key operating mechanism ineffective to operate said key, a second lever, and means actuated upon operation of said second lever for operating said first lever and for also operating a different key of said adding machine.

12. In a computing mechanism, means for retaining a plurality of cards each of which has one or more notches along one edge corresponding to numbers to be added, means for feeding said cards one by one to a work station, a plurality of number representing fingers adapted to be positioned above the notched edge of the card fed to said work station, means for moving said fingers downwardly to one side of said card and adjacent said notches whereby one or more fingers may pass through said notches and the other fingers are arrested by said card, a computing machine, and means comprising a system of mechanically interconnected elements actuated by and extending from said fingers to said computing machine for causing said computing machine to register the sum of the numbers corresponding to the said fingers which pass through said notches, and means operated in response to passing of a particular one of said fingers through said notches for causing said computing machine to perform a computing operation.

13. In a computing mechanism, in combination, means for retaining a plurality of cards each of which has one or more notches along one edge corresponding to numerals to be added, means for feeding said cars one by one to a work station, a plurality of pivotally mounted number representing fingers adapted to be positioned above the notched edge of the cards as they are fed to said work station, means for ejecting said cards from said work station after a chosen interval of time, means for moving said fingers downwardly to one side of a card while it is in said work station whereby one or more fingers pivotally pass through said notches while other fingers are arrested by said card, an adding machine, means comprising a mechanically engaging system of links and levers extending between said fingers and adding machine for causing said adding machine to register the sum of the numbers represented by the fingers which pass through the notches of each card, and means operated from a notch in a card for causing said adding machine to total the numbers thereby registered.

14. In combination, an adding machine having an operating bar and a totalizing key, a lever having a biased position and being movable through an operating zone, means responsive to movement of said lever through a first portion of said zone for depressing said operating bar and through an intermediate portion of said zone for releasing said operating bar and through a last portion of said zone for again depressing and then releasing said operating bar, and means operative while said lever is in said intermediate portion of said operating zone for depressing said totalizing key.

15. In combination, an adding machine having an operating bar and a totalizing key, a lever having a biased position and being movable through an operating zone, means responsive to movement of said lever through a first portion of said zone for depressing said operating bar and through an intermediate portion of said zone for releasing said operating bar and through a last portion of said zone for again depressing and then releasing said operating bar, and means operative while said lever is in said intermediate portion of said operating zone for depressing said totalizing key, and means for preventing said operations of said operating bar and said totalizing key while said lever is returning to said biased position.

16. In combination, a plurality of number-representing fingers and a special control finger each of which is movable from a biased position to an operative position, an adding machine, a plurality of lever mechanisms associated with said number representing fingers each of which is adapted to cause said adding machine to register a number when one of said fingers is moved to its operative position, and means operative when said special control finger is moved to its operative position for rendering all of said lever mechanisms ineffective to operate said adding machine.

17. In a data transfer mechanism adapted for attachment to a computing machine, in combination, a pivot forming member, a plurality of fingers pivotally mounted on said member and adapted to rotate about said member, means for normally retaining said fingers in a biased position against an opposing force and operable to release said fingers to permit them to be moved under action of said force to an operative position unless arrested in an intermediate position, means for shifting said pivot forming member in space in an operative direction, and a plurality of lever mechanisms selectively controlled according to the fingers which move to said operative position and actuated upon shifting of said pivot forming member in said operative direction.

18. In a data transfer mechanism adapted for attachment to a computing machine, in combination, a plurality of number representing fingers, each of said fingers being rotatable to an intermediate position or to an extreme position, common carrier means for said fingers, means for shifting said common carrier means in space through a predetermined distance, and a plurality of independent lever mechanisms each of which is operated as a result of rotation of one of said fingers to said extreme position and movement of said carrier means through said predetermined distance.

19. In combination, an adding machine having keys corresponding to numerals, a plurality of fingers each of which corresponds to a number and is selectively actuable from a biased position to an operating position, a member carrying said plurality of fingers and movable back and forth in space, means for causing a limited rotational movement of said fingers when said member is in one extreme position, whereby selected ones of said fingers move to said operating position, means for periodically moving said member back and forth in space, and means actuated when said member is moved to its other extreme position for operating said adding machine keys according to the fingers in said operating position.

20. In a data transfer mechanism adapted for attachment to a computing machine, in combination, a pivot forming member, a plurality of fingers pivotally mounted on said member and adapted to rotate about said member, means for normally retaining said fingers in a biased position against an opposing force and operable to release said fingers to permit them to be moved under action of said force to an operative position unless arrested in an intermediate position, means for shifting said pivot forming member in space in an operative direction, a plurality of lever mechanisms associated with said plurality of fingers for operating the keys of said computing machine, and a cam element associated with each of said plurality of fingers and adapted when a finger is in said operative position and said pivot forming member is shifted in an operative direction to engage and actuate the associated lever mechanism.

21. In combination, an adding machine having keys corresponding to numerals, two fingers each of which corresponds to a numeral and is selectively actuable from a biased position to an operating position, a first mechanically operated mechanism for operating a key on said adding machine corresponding to the numeral represented by one of said fingers, a second mechanically operated mechanism for operating another key on said adding machine corresponding to the numeral represented by the other of said fingers, a third mechanically operated mechanism for operating still another key on said adding machine corresponding to the sum of the numerals represented by said two fingers, and means associated with said fingers for effecting operation of said mechanically operated mechanisms according as said fingers are actuated to said operating position.

22. In combination, an adding machine having at least a first key, a second key and a third key; a first movable element for operating said first key; a second movable element for operating said second key; a third movable element for operating said third key; two fingers each of which is selectively actuable; means associated with said two fingers for effecting operation of said first and second movable elements; and means operated in response to simultaneous operation of said first and second movable elements for operating said third movable element.

23. In combination, an adding machine having at least three keys and an operating element operable to effect adding of numbers corresponding to said keys, one of said keys corresponding to the sum of the numbers represented by the two other of said keys, a first all mechanical mechanism for operating said sum key, two other all mechanical mechanisms for operating selectively said two other keys, two selectively operated control elements, means operative in response to selective operation of one only of said two control elements for effecting actuation of one of said two other mechanisms to operate one of said keys associated therewith, means operative in response to simultaneous operation of said two control elements for effecting operation of said first mechanism only to operate said sum key only, and means for operating said operating element on said adding machine in timed relation with operation of either of said mechanisms.

24. In a computing mechanism, means for retaining a plurality of cards each of which has one or more notches along one edge corresponding to numbers to be computed; means for feeding said cards one by one to a work station, a plurality of number representing fingers adapted to be positioned above the notched edge of the card fed to said work station, means for moving said fingers downwardly to one side of the card and adjacent the notches in the card whereby one or more fingers pass through said notches and the other fingers are arrested by said card, a computing machine, a plurality of elements so arranged as to form a mechanical linkage system between said fingers and said computing machine, and means for actuating said mechanical linkage system in a manner such that when said fingers are actuated downwardly said computing machine is caused to register the sum of the numbers corresponding to all of the fingers which pass through said notches.

RICHARD LELAND NASH.